Patented Feb. 17, 1942

2,273,425

UNITED STATES PATENT OFFICE 2,273,425

CHEWING GUM

Waldorf S. Traylor, Newport, Del., assignor to Hercules Powder Company, Wilmington, Del., a corporation of Delaware No Drawing. Application June 29, 1940, Serial No. 343,167

11 Claims. (Cl. 99—135)

This invention relates to chewing gum and more particularly to an improved chewing gum base embodying ethyl cellulose.

It is an object of the present invention to provide an improved chewing gum.

Another object is to provide a chewing gum which has less taste and odor imparted by its principal constituents other than the flavoring and sweetening constituents than chewing gum heretofore available.

Another object is to provide a chewing gum having improved properties as regards storage, retention of flavor, physical characteristics and chewing properties.

Another object is to provide a chewing gum embodying a resin, which chewing gum is of reduced tackiness by virtue of the incorporation therein of an ingredient which reduces or eliminates the tackiness normally imparted by the resin.

Another object is to provide a chewing gum wherein there is incorporated as a substantial portion of the chewing gum base, a constituent which is inert with respect to color, taste, odor, which may be readily blended with the ingredients normally employed in chewing gum such as rubber, resin, gum chicle, etc., and which serves to impart new and useful properties to the chewing gum made therewith.

Other objects will more fully hereinafter appear as the following description proceeds.

I have discovered that a chewing gum or chewing gum base embodying ethyl celulose has new and improved properties. Ethyl cellulose is transparent or colorless and therefore imparts no color to the chewing gum base and takes the color of the material with which it is admixed. Ethyl cellulose is physiologically inert, and therefore presents no objectionable characteristics in this respect. Ethyl cellulose is completely odorless and tasteless and therefore is additionally advantageous in chewing gum, since its use minimizes to a large extent the slight odor and taste imparted by the other constituents of the chewing gum base, such as, rubber, gum chicle, resin, etc. Ethyl cellulose may be readily blended with rubber, gum chicle, and the resins normally employed in formulating chewing gum. A chewing gum base made with ethyl cellulose as an important constituent thereof may be readily mixed with the usual flavoring and sweetening ingredients to form the final chewing gum. The resulting chewing gum has exceedingly good properties with regard to storage, keeping of flavor, chewing characteristics either before or after a prolonged period of storage, and lasting quality of flavor upon being chewed. The incorporation of ethyl cellulose as a constituent of the chewing gum base is carried out easily because of the readiness with which the ethyl cellulose admixes with the rubber, or the gum chicle and the other constituents of the chewing gum base. Thus the ordinary mixing machinery, such as the usual two or three roll mill or a Banbury mixer may be employed in the formulation of the chewing gum base.

While ethyl cellulose may be, under certain circumstances, used as the sole binding constituent of the chewing gum base, provided a suitable plasticizer is incorporated therewith, it is preferred to use the ethyl cellulose in conjunction with other binding constituents such as a suitable rubber-like material, a suitable resinous constituent, or both. For example, I may employ substantially equal amounts of rubber and ethyl cellulose. The rubber may be in the form of ordinary crepe rubber, or may be in the form of a latex, such as a natural or an artificially prepared rubber latex. If desired, the ethyl cellulose and the rubber may be admixed after having been previously in the form of aqueous dispersion, for example, by admixing an aqueous dispersion of ethyl cellulose with a rubber latex followed by evaporation of the water. Instead of using natural rubber, synthetic rubber may be employed, such as, polymerized butadiene, polymerized chlorobutadiene, polymerized methylbutadiene, polymerized dimethylbutadiene, etc., and latexes made therefrom. Instead of natural or synthetic rubber, rubber substitutes may be employed, such as factice made by reacting a vegetable oil with a vulcanizing agent such as sulfur or sulfur monochloride, or the like, or other rubber-like materials, such as gutta percha, balata, jelutong, may be used. These substances, i. e. rubber, synthetic rubber, rubber substitutes, and other rubber-like materials such as those mentioned, will be referred to hereinafter and in the claims as "rubber-like materials" or simply as "rubbers." Gum chicle can be employed in the same manner. While ethyl cellulose is not compatible with rubber and rubber-like materials, it may be intimately blended therewith on a two-roll mill or in a Banbury mixer to give a uniform mixture.

The relative amounts of ethyl cellulose and rubber-like material may be such that the ratio of rubber to ethyl cellulose range from about 1 to 10 up to about 10 to 1, and preferably from about 1 to 1.5 up to about 1.5 to 1. Equal amounts of ethyl cellulose and rubber-like material give an excellent chewing gum base.

As the ethyl cellulose component of the chewing gum base, I may use any of the ordinary commercially available grades of ethyl cellulose varying in ethoxyl content from about 38% up to about 51% and preferably from about 43% to about 49%. I may use ethyl cellulose of widely varying viscosity, say from 5 to 500 centipoises in a 5% solution. Thus, I may use ethyl cellulose having an ethoxyl content of 46.8 to 48.5% and a viscosity in centipoises of 270 to 330 for the 5% solution in 80/20 toluene-ethyl alcohol, or I may use a low viscosity ethyl cellulose having an ethoxyl content of 43.5–44.5% and a viscosity in the 5% solution in 70/30 toluene-ethyl alcohol of 20 to 24 centipoises.

It is usually preferred to incorporate a resin in the chewing gum base whether the base be made of ethyl cellulose or of a blend of ethyl cellulose with rubber-like material. As such a resin, I may employ rosin, ester gum, cumarone resin, chlorinated paraffin, or other natural or synthetic resins. Ethyl cellulose is miscible or compatible with many resins, such as rosin, hydrogenated rosin, pure phenolics, alcohol-soluble natural resins, etc. While it is incompatible with such resins as paracumarone, pure alkyds, polymerized vinyl acetate, polymerized vinyl chloride, and the like, these resins may be readily blended with ethyl cellulose on the two-roll mill or in the Banbury mixer. Many resins, when incorporated in chewing gum impart too much tack to the chewing gum. I have found that when ethyl cellulose is employed in conjunction with the resin, it markedly reduces or completely eliminates the tackiness imparted by the resin. To effect this end, ethyl cellulose may be incorporated in the chewing gum base in amounts varying from about 1% to about 5% on the weight of the resin, or larger amounts may be used. A particularly desirable ratio of resin to ethyl cellulose is in the neighborhood of, say 5 to 1 up to 6 to 1. Thus, the ratio of resin to ethyl cellulose may vary from about 1 to 10 up to about 100 to 1 and preferably from about 5 to 1 up to about 50 to 1.

The amount of resin in the mixture is variable within wide limits. Where the chewing gum base comprises as its principal binding constituents ethyl cellulose and resin, the amount of resin is determined by the limits set forth in the preceding paragraph, although the limits referred to are also applicable where a rubber-like material is present in addition to ethyl cellulose and resin. Where a rubber-like material is present, the ratio of rubber-like material to resin may vary within extremely wide limits, say from about 1 to 1 up to about 100 to 1 and preferably from about 5 to 1 up to about 20 to 1.

In the case of the ternary mixture wherein the principal components are ethyl cellulose, a rubber-like material, and a resin, the relative amounts of these components may vary within the foregoing limits. The ternary composition may contain from 1 to 100% ethyl cellulose, from 0 to 99% rubber-like material and from 0 to 85% resin, and preferably from 10 to 50% ethyl cellulose, from 40 to 60% rubber-like material and from 5 to 50% resin, the percentages of the three components totaling 100%. The ternary system containing ethyl cellulose, a rubber-like material, and a resin can be mixed with any desired kind or quantity of softening agents to obtain desirable properties. Use of such softeners is common practice in the art, and renders chewable compositions which might otherwise not be chewable.

A chewing gum base comprising ethyl cellulose and gum chicle as the rubber-like constituent, with or without a suitable resin, has been found to be particularly suitable. It has been found that ethyl cellulose may be readily blended with gum chicle to give a uniform mixture. By virtue of its properties, ethyl cellulose is a desirable binding agent for use in conjunction with gum chicle, the ethyl cellulose serving as an inert, colorless, odorless and tasteless admixture material for the gum chicle. By the incorporation of approximately equal quantities of ethyl cellulose and gum chicle in the chewing gum base, a very desirable product results.

The several ingredients of the chewing gum base are incorporated with one another in any desired manner. A preferable method from the standpoint of economy and convenience is to place the ingredients on the usual roll mill or in a Banbury mixer whereupon ready incorporation of the several ingredients with one another is obtained. The mixing may desirably be carried out at an elevated temperature which gives rise to a more rapid intermingling and production of a homogeneous product in which all of the constituents are intimately admixed with one another.

Any of the chewing gum compositions containing ethyl cellulose may be admixed with any suitable type and amount of softener or plasticizer to render the composition more chewable. For example, in addition to the constituents named which may be considered to be the principal constituents of the chewing gum base, suitable waxy materials or oily softening agents may be incorporated in the chewing gum base during its manufacture. Examples of suitable waxy constituents are montan wax, beeswax, candelilla wax, Japan wax, spermaceti, stearic acid, cetyl alcohol, stearyl alcohol, hydrogenated castor oil (sold under the trade name "Opalwax"), etc. Examples of suitable oily softening agents are petrolatum, hydrogenated cottonseed oil (preferably having a melting point of at least 55° C.), cocoanut oil, and other suitable oily materials which do not impart an undesirable taste or odor to the product. The amount of waxy material or oily softening agent incorporated in the mixture may vary within wide limits, for example, from 0 to 30% by weight of the chewing gum base.

There may also be incorporated in the chewing gum base, suitable amounts of a plasticizer for the ethyl cellulose. The plasticizer employed should be of a type which is substantially insoluble in water or mouth fluids, physiologically inert, and which imparts no undesirable taste or odor to the chewing gum base. Examples of suitable plasticizers are hydrogenated methyl abietate, dibutyl phthalate, diethyl phthalate, diamyl phthalate, butyl stearate, amyl stearate, dibutyl tartrate, cyclohexyl adipate, dibutyl sebacate, tributyl citrate, ethyl maleate, glyceryl maleate, diethyl maleate, dipropyl maleate, tributyl phosphate, ethyl abietate, methyl abietate, triacetin, tributyrin, triethyl citrate, acetyl triethyl citrate, the lower polymer of cumarone and indene commonly known as cumarone oil and consisting chiefly of the dimers and other materials such as lauryl alcohol, cetyl alcohol, stearyl alcohol, hydroxyl stearyl alcohol, etc. It is preferred to employ a plasticizer which exerts solvent action upon the ethyl cellulose employed in the composition. However, the plasticizer employed may be one which also exerts plasticizing or solvent action upon the resin and upon the rubber-like material employed in the composition. The amount of plasticizer employed is variable within quite wide limits, for example, from 0 to 50% of the chewing gum base.

If desired, the composition may comprise as its chief constituents ethyl cellulose and a wax of the type set forth above, in amounts such that the ratio of ethyl cellulose to wax ranges from about 10 to 1 to about 1 to 1, and preferably from about 5 to 1 to about 2 to 1. Mixtures of wax and ethyl cellulose are unusual in that they are not cheesy but are plastic and chewy, when suitably plasticized.

If desired, there may be incorporated in the chewing gum base, suitable amounts of inert pigments or filler material, such as, for example, from 0 to 50% by weight of the composition of such pigments and fillers as clay, infusorial earth, barium sulfate in the form, for example, of ordinary ground barytes, magnesium oxide, whiting or calcium carbonate, finely ground silica, talc or asbestine, carbon black, activated carbon, iron oxide pigment, yellow ochre, magnesium carbonate, calcium sulfate, and other inert and harmless pigments and fillers.

In order to prepare the final chewing gum from the base made as described above, there may be incorporated with the base in any suitable manner, sweetening and flavoring agents of the usual type, in the usual amount. As sweetening agents, there may be employed, powdered cane sugar, glucose syrup, invert sugar, honey, levulose, saccharin, chocolate syrup, etc. As flavoring agents, there may be incorporated any of the known flavoring essential oils, such as oil of peppermint, spearmint, wintergreen, etc., licorice, vanilla, and where chicle is not present in the composition, powdered cocoa, and the like. Following incorporation of these flavoring and sweetening agents, the mixture is treated and cut into the final chewing gum in the usual manner.

Below are given several examples of chewing gum base made in accordance with the present invention. In certain of the examples, the preparation of the final chewing gum from the base is described.

*Example 1*

| | Parts by weight |
|---|---|
| Ethyl cellulose (viscosity 20–24 cp., 46.8–48.5% ethoxyl content | 117.2 |
| Crepe rubber | 117.2 |
| Hydrogenated cottonseed oil (known commercially as Coto flakes) | 116.8 |
| Cocoanut oil | 48.8 |

The rubber was milled for 20 minutes starting on a cold mill, frictional heat developing as the rolling continues. The ethyl cellulose was brought into plastic homogeneous form by colloiding it on the hot two-roll mill at about 135° C. The milled rubber was added slowly to the colloided ethyl cellulose on the mill, progressively cooling the roll as the addition of the rubber progressed. Finally, the hydrogenated cottonseed oil and the cocoanut oil were added and milled into the mass on the rolls which were barely luke-warm and which were essentially cold at the finish.

The base prepared as above was formulated into a chewing gum as follows:

| | Parts by weight |
|---|---|
| Chewing gum base made as described above | 100 |
| Pure sucrose | 111 |
| Corn syrup (known commercially as Crystal White Karo) | 24 |
| Oil of peppermint | 2 |

These ingredients were incorporated on a cold mill. The chewing gum base was first placed on the mill and the other ingredients were added and milled until the mass appeared homogeneous. A chewing gum of excellent chewing characteristics was obtained.

*Example 2*

| | Parts by weight |
|---|---|
| Ethyl cellulose (same as in Example 1) | 10 |
| Hydrogenated methyl abietate (sold commercially at Hercolyn) | 50.0 |
| Cumarone indene resin (sold commercially as Neville R-3) | 50.0 |

The hydrogenated methyl abietate and the cumarone resin were heated until molten whereupon the ethyl cellulose was added and dissolved in the mixture. Upon cooling, a good chewing gum base was obtained.

*Example 3*

| | Parts by weight |
|---|---|
| I wood rosin | 80 |
| Ethyl cellulose (46.8–48.5% ethoxyl content, 90–105 cp. viscosity) | 16 |
| Montan wax | 20 |
| Chlorinated paraffin (56% chlorinated) | 10 |

The wax and the resins were mixed together and heated until homogeneous whereupon the ethyl cellulose was incorporated. The resulting material was a good chewing gum base.

*Example 4*

| | Parts by weight |
|---|---|
| Ethyl cellulose (same as in Example 3) | 30 |
| Barium sulfate | 30 |
| Crepe rubber | 24 |
| Stearic acid | 40 |

The ethyl cellulose and the barium sulfate filler were first incorporated on the two-roll mill, the ethyl cellulose being first colloided on the mill at 135° C. after which the water-moistened pigment was added and worked into the plastic ethyl cellulose until the water had completely evaporated and a homogeneous mixture was obtained. The resulting material was in the form of pigment chips. These chips were incorporated next with the crepe rubber on the rolls. The stearic acid was then introduced on the roll. Upon cooling, there was obtained a product having remarkable chewing properties as such and when made into a final chewing gum. The chewing gum base was completely odorless and tasteless and of a very light color.

*Example 5*

| | Parts by weight |
|---|---|
| Ethyl cellulose (low viscosity, 20–24 cp., 48.5–50% ethoxyl content) | 24 |
| Dibutyl phthalate | 12 |
| Crepe rubber | 24 |
| Clay (air floated) | 50 |

The ethyl cellulose and the dibutyl phthalate were first colloided on the two-roll mill at a temperature of 100–120° C. The clay was added and thoroughly mixed. Then the crepe rubber was added and mixed into the composition. The product was a good chewing gum base.

Example 6

| | Parts by weight |
|---|---|
| Ethyl cellulose* | 25 |
| Crepe rubber (milled 30 minutes) | 25 |
| Batavia dammar gum | 20 |
| Hydrogenated cottonseed oil (Coto flakes) | 10 |
| Cocoanut oil | 20 |

*47.7% ethoxyl, viscosity 22 cp. in standard 5% solution.

The ethyl cellulose was rolled into a plastic sheet on the hot two-roll mill at 280° F. The rubber was worked into the plastic ethyl cellulose slowly, the rolls being progressively cooled. The other ingredients were added, keeping roll temperatures adjusted so that the consistency of the mass permitted good mixing. An excellent chewing gum base was obtained in which ethyl cellulose counteracted the tackiness of the resin.

Example 7

| | Parts by weight |
|---|---|
| Ethyl cellulose* | 34 |
| Gum chicle | 51 |
| Cocoanut oil | 15 |

*47.7% ethoxyl, viscosity 22 cp. in standard 5% solution.

The ethyl cellulose was rolled into a plastic sheet on the hot two-roll mill at 280° F. The chicle was worked into the plastic ethyl cellulose slowly, the rolls being adjusted in temperature so that the consistency of the mass permitted good mixing. The oil was finally added and the mass worked until homogeneous. A good chewing gum base resulted.

From the foregoing, it will be seen that the present invention provides a greatly improved chewing gum base and chewing gum which is easy to manufacture and which possesses characteristics not heretofore available in chewing gum bases. These advantages are attributable to the use of ethyl cellulose as a substantial component of the chewing gum base. The product is tasteless, odorless, tackfree, of the desired consistency for manufacture, shipment and use, of the desired light color, and completely harmless when chewed. The ethyl cellulose imparts an inertness to the chewing gum base which is desirable, with the result that the chewing gum base and the chewing gum made therefrom, can be stored over long periods of time without deterioration or discoloration. Numerous other advantages of the present invention will be immediately apparent to those skilled in the art.

I wish it to be understood that the details and examples hereinbefore set forth are illustrative only and that the invention as broadly described and claimed is in no way limited thereby.

What I claim and desire to protect by Letters Patent is:

1. A chewing gum material comprising ethyl cellulose and a gum selected from the group consisting of resins, rubbers, and chicle.

2. A chewing gum material comprising a resin and ethyl cellulose.

3. A chewing gum material comprising a rubber and ethyl cellulose.

4. A chewing gum material comprising approximately equal quantities by weight of rubber and ethyl cellulose.

5. A chewing gum material comprising a rubber and ethyl cellulose in amounts such as to give a weight ratio of said rubber to ethyl cellulose ranging from about 1 to 1.5 up to about 1.5 to 1.

6. A chewing gum material comprising a rubber, a resin, and ethyl cellulose.

7. A chewing gum material comprising a resin which normally imparts an objectionable tackiness to the base, and ethyl cellulose in an amount sufficient to substantially reduce the tackiness imparted by the resin.

8. A chewing gum material comprising a resin which normally imparts an objectionable tackiness to the base, and ethyl cellulose in an amount such as to yield a weight ratio of said resin to ethyl cellulose ranging from about 1 to 10 up to about 100 to 1.

9. A chewing gum material comprising ethyl cellulose, a rubber, and a modifying constituent selected from the group consisting of waxy materials, oily softening agents, and plasticizers for the ethyl cellulose.

10. A chewing gum material comprising ethyl cellulose and gum chicle.

11. A chewing gum material comprising a chewing gum base containing as principal binding components from about 10% to about 50% of ethyl cellulose, from about 40% to about 60% of a rubber-like material, and from about 5% to about 50% of a resin, said percentages being by weight and totaling 100%.

WALDORF S. TRAYLOR.

DISCLAIMER 2,273,425.—*Waldorf S. Traylor*, Newport, Del. CHEWING GUM. Patent dated Feb. 17, 1942. Disclaimer filed Apr. 11, 1945, by the assignee, *Hercules Powder Company*.

Hereby enters this disclaimer to claims 1, 2, 3, 6, 7, 8, and 9 of said patent.

[*Official Gazette May 8, 1945*.]